United States Patent
Perraud et al.

(10) Patent No.: US 10,743,210 B2
(45) Date of Patent: Aug. 11, 2020

(54) USING UPLINK BUFFER STATUS TO IMPROVE VIDEO STREAM ADAPTATION CONTROL

(71) Applicant: Intel IP Corporation, Santa Clara, CA (US)

(72) Inventors: Eric Perraud, Plaisance due touch (FR); Linda S. Cline, Forest Grove, OR (US); Jordi Artacho Terreu, Cugnaux (FR); Sri Ranjan Srikantam, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 781 days.

(21) Appl. No.: 15/170,005

(22) Filed: Jun. 1, 2016

(65) Prior Publication Data

US 2017/0353885 A1    Dec. 7, 2017

(51) Int. Cl.
| | |
|---|---|
| *H04W 28/02* | (2009.01) |
| *H04N 19/00* | (2014.01) |
| *H04N 21/2187* | (2011.01) |
| *H04L 29/06* | (2006.01) |
| *H04N 21/238* | (2011.01) |
| *H04N 21/2662* | (2011.01) |
| *H04N 21/24* | (2011.01) |
| *H04L 12/825* | (2013.01) |
| *H04N 19/115* | (2014.01) |
| *H04N 19/152* | (2014.01) |

(Continued)

(52) U.S. Cl.
CPC ..... *H04W 28/0278* (2013.01); *H04L 65/4069* (2013.01); *H04L 65/602* (2013.01); *H04L 65/607* (2013.01); *H04L 65/80* (2013.01); *H04N 19/00* (2013.01); *H04N 21/2187* (2013.01); *H04N 21/238* (2013.01); *H04N 21/2402* (2013.01); *H04N 21/2662* (2013.01); *H04L 47/25* (2013.01); *H04N 19/115* (2014.11); *H04N 19/152* (2014.11); *H04N 19/164* (2014.11); *H04N 19/172* (2014.11)

(58) Field of Classification Search
CPC ......... H04W 28/0278; H04N 21/2187; H04N 21/238; H04N 21/2402; H04N 21/2662; H04N 19/00; H04N 19/164; H04N 19/172; H04N 19/115; H04N 19/152; H04L 65/4069; H04L 65/602; H04L 65/607; H04L 65/80; H04L 47/25
See application file for complete search history.

(56) References Cited

U.S. PATENT DOCUMENTS

| | | | |
|---|---|---|---|
| 8,791,981 B2 * | 7/2014 | Fang | ............... H04N 19/188 348/14.08 |
| 9,445,051 B1 * | 9/2016 | Kantharaju | ............... H04N 7/15 |

(Continued)

OTHER PUBLICATIONS

Universal Mobile Telecommunications System (UMTS); Packet Data Convergence Protocol (PDCP) specification (3GPP TS 25.323 version 13.0.0 Release 13) (45 pages).

*Primary Examiner* — Will W Lin
(74) *Attorney, Agent, or Firm* — Trop, Pruner & Hu, P.C.

(57) ABSTRACT

A method for sending video over a cellular link includes obtaining from a modem layer an uplink buffer status metric. An indication derived from the metric is transmitted from the modem layer to a video source application. The indication is used to adjust a video bitrate.

26 Claims, 9 Drawing Sheets

(51) Int. Cl.
    *H04N 19/164*   (2014.01)
    *H04N 19/172*   (2014.01)

(56) References Cited

U.S. PATENT DOCUMENTS

| | | | | |
|---|---|---|---|---|
| 2004/0098748 | A1* | 5/2004 | Bo | H04N 7/17336 |
| | | | | 725/105 |
| 2012/0173748 | A1* | 7/2012 | Bouazizi | H04L 65/4084 |
| | | | | 709/231 |
| 2013/0113874 | A1* | 5/2013 | Fang | H04N 19/188 |
| | | | | 348/14.08 |
| 2014/0079016 | A1* | 3/2014 | Dai | H04L 5/0041 |
| | | | | 370/330 |
| 2014/0220960 | A1* | 8/2014 | Nagel | H04W 24/10 |
| | | | | 455/419 |
| 2014/0295865 | A1* | 10/2014 | Fantaye | H04W 72/1226 |
| | | | | 455/450 |
| 2015/0032851 | A1* | 1/2015 | Lieber | H04L 65/602 |
| | | | | 709/219 |
| 2015/0222555 | A1* | 8/2015 | Rickeby | H04L 47/34 |
| | | | | 370/230 |
| 2015/0373328 | A1* | 12/2015 | Yenneti | H04N 19/61 |
| | | | | 375/240.03 |
| 2016/0088322 | A1* | 3/2016 | Horev | H04N 21/8456 |
| | | | | 725/14 |
| 2016/0381691 | A1* | 12/2016 | Panchal | H04L 1/203 |
| | | | | 370/329 |
| 2017/0034545 | A1* | 2/2017 | Rozenberg | H04N 21/2402 |
| 2017/0201461 | A1* | 7/2017 | Cheng | H04L 47/32 |
| 2017/0324673 | A1* | 11/2017 | Sze | H04W 28/10 |
| 2018/0132010 | A1* | 5/2018 | Fu | H04L 12/4625 |
| 2019/0159071 | A1* | 5/2019 | Yavuz | H04L 65/80 |

* cited by examiner

USING UPLINK BUFFER STATUS TO IMPROVE VIDEO STREAM ADAPTATION CONTROL

BACKGROUND

This relates generally to dealing with congestion in a cellular link between a video source and a video sink where the video source sends video data and the video sink receives the video data.

This relates generally to dealing with congestion in a wireless link between a wireless video device which transmits video data to a wireless base station, where the wireless video device can be decomposed in a video source (Open System Interconnection (OSI) Model layer 7) and a network sink (OSI Model layers 3-2-1) including a modem which transmits video data over a cellular link to the wireless base station.

Congestion may occur in the wireless link unbeknownst to the video sender. This is because the congestion happens in layers 1 and 2 and the information about the congestion may be held at layer 2 (which corresponds to the modem layer that transmits the video data). However, the video source in OSI Model layer 7, or the application layer, which decides what data to send, may be oblivious to the congestion. As a result, the video source can continue to push data from layer 7 to layer 2 but the modem is unable to effectively transmit because of the congestion.

Current cellular specifications for video calls have a bitrate adaptation mechanism. The mechanism attempts to cause the video sender to control its video bitrate based on feedback which the video receiver reports to the sender using a Temporary Maximum Media Stream Bitrate Request (TMMBR) Real-Time Transport Protocol (RTCP) message or by using packet loss statistics from receiver reports. However, the TMMBR does not always achieve successful bitrate adaptation because it may not be supported by devices, may not always be reliable, may be lost, and is not particularly well suited for use in the uplink path. And packet loss based estimation may not be as accurate or as timely as other estimation techniques.

BRIEF DESCRIPTION OF THE DRAWINGS

Some Embodiments are Described with Respect to the Following Figures.

DETAILED DESCRIPTION

In accordance with some embodiments, radio information residing in the OSI model level 2 may be directly provided to the application layer in OSI model level 7 or may be used to deliver some useful information to the application layer. This is particularly applicable to Long Term Evolution (LTE) networks. The level 2 layer may provide instantaneous available uplink radio bandwidth or an estimated available uplink radio bandwidth to the video source in level 7. This is used by the video source to match the video bitrate to the uplink radio bandwidth and it enables the video bitrate adaptation to converge more quickly in the case of uplink radio congestion from user equipment to a base station.

For this purpose, the level 2 layer can use the uplink level 2 buffer status that is managed by the modem level 2 layer. An uplink level 2 buffer value is returned to the video stack in level 7 when a new video frame is pushed into the modem. It may be used by the video source to determine the maximum size of subsequent video frames, to thereby adjust the overall video stream bitrate or to otherwise adapt to congestion in the link between a video source and the wireless base station.

When the video stack in the video source pushes a video frame made up of multiple Real-Time Protocol (RTP) packets to an LTE modem stack, the modem returns a radio metric that, in one embodiment allows the video stack to compute the maximum instantaneous bitrate and determine the size of next group of video frames to avoid congestion in the uplink radio path.

The metric is the uplink buffer status of the video bearer (BS). The layer 2 stack maintains a buffer status per bearer. For a given bearer, it describes the amount of non-transmitted data waiting for an uplink radio grant.

Thus according to one embodiment, the radio metric may be provided to the video stack from the modem level 2 layer as follows. The modem knows the video bearer identifier because it has the quality channel indicator (QCI) that indicates the bearer identification. Alternatively, the modem may obtain this information from a signaling mechanism between the modem and the telephony layers. Other techniques are also possible.

When the BS of the video bearer is zero, all the prior video data has been transmitted. In this case, the modem stores a local time $\Delta T_{bs0}$ which is the time interval between the time when last frame was pushed to the video bearer queue and the time when BS was zero. This effectively determines how fast the network has been able to pull the video data during the last video transmission interval.

Then when the modem receives a new video frame at time $t_n$, it returns both the BS value, $bs_e(n-1)$, which is the remaining amount of video data not being transmitted if not null and $\Delta T_{bs0}$ (if $bs_e(n-1)$ is zero) to the video stack.

The video stack bitrate logic works as follows. When the video stack pushes a new frame into the modem, it computes a new quantity of video which is waiting to be sent over the network as:

$$bs_s(n)=bs_e(n-1)+\text{frameSize}(n),$$

$bs_e(n-1)$ being returned by the modem where the subscript s indicates the start of the considered video frame interval and the subscript e indicates the end of the considered video frame interval.

If $bs_e(n-1)$ is not 0 at $t=t_n$, the video sender is pushing more data than the uplink radio bandwidth which is the bandwidth the base station assigns to the user equipment. Then sending video bitrate is reduced.

The available bandwidth for a video call during the last frame interval, $\Delta t(n-1)$ is:

$$\text{Radio bitrate} = lte_{br}(n) = \frac{bs_s(n-1) - bs_e(n-1)}{\Delta t(n-1)}$$

The video stack can compute the size of the next frame so that the video encoder and packetizer optimize the available uplink radio bandwidth. The goal is to match the video bitrate to the radio uplink bandwidth, meaning reducing the video frame size that $bs_e(n+1)$ is equal to zero so all previous video data was transmitted when the next frame (n+2) is delivered to the modem. This can be formalized as follows:
At $t=t_n$ the inputs are:
   $bs_e(n-1)$ reported by modem layer 2
   frameSize (n) computed at $t=t_{n-1}$ $$lte_{br}(n) = \frac{bs_s(n-1) - bs_e(n-1)}{\Delta t(n-1)}$$

$bs_s(n)=bs_e(n-1)+\text{frameSize}(n)$
At $t=t_n$ size of next frame is computed using the algorithm:

expected $\widetilde{bs}_e(n)=bs_s(n)-lte_{br}(n)*\Delta t(n)$

Is the expected remaining video data in the modem at $t=t_{n+1}$
At $t=t_{1+1}$ frame (n+1) is pushed into the modem expected $\widetilde{bs}_s(n+1)=bs_e(n)+\text{maxFrameSize}(n+1)$ Is the expected quantity of video data once new frame (n+1) is pushed in modem at $t=t_{n+1}$ expected $\widetilde{bs}_e(n+1)=\widetilde{bs}_s(n+1)-lte_{br}(n)*\Delta t(n+1)$ Is the expected remaining video data in the modem at $t=t_{n+2}$
We want:

expected $\widetilde{bs}_e(n+1)=0$

Resolving this equation results in:

$$\text{maxFrameSize}(n+1) = lte_{br}(n)*(\Delta t(n+1)+\Delta t(n))-bs_s(n) = $$
$$2*lte_{br}(n)*\text{averageFrameInterval}(n)-bs_s(n)$$

Figure 1:
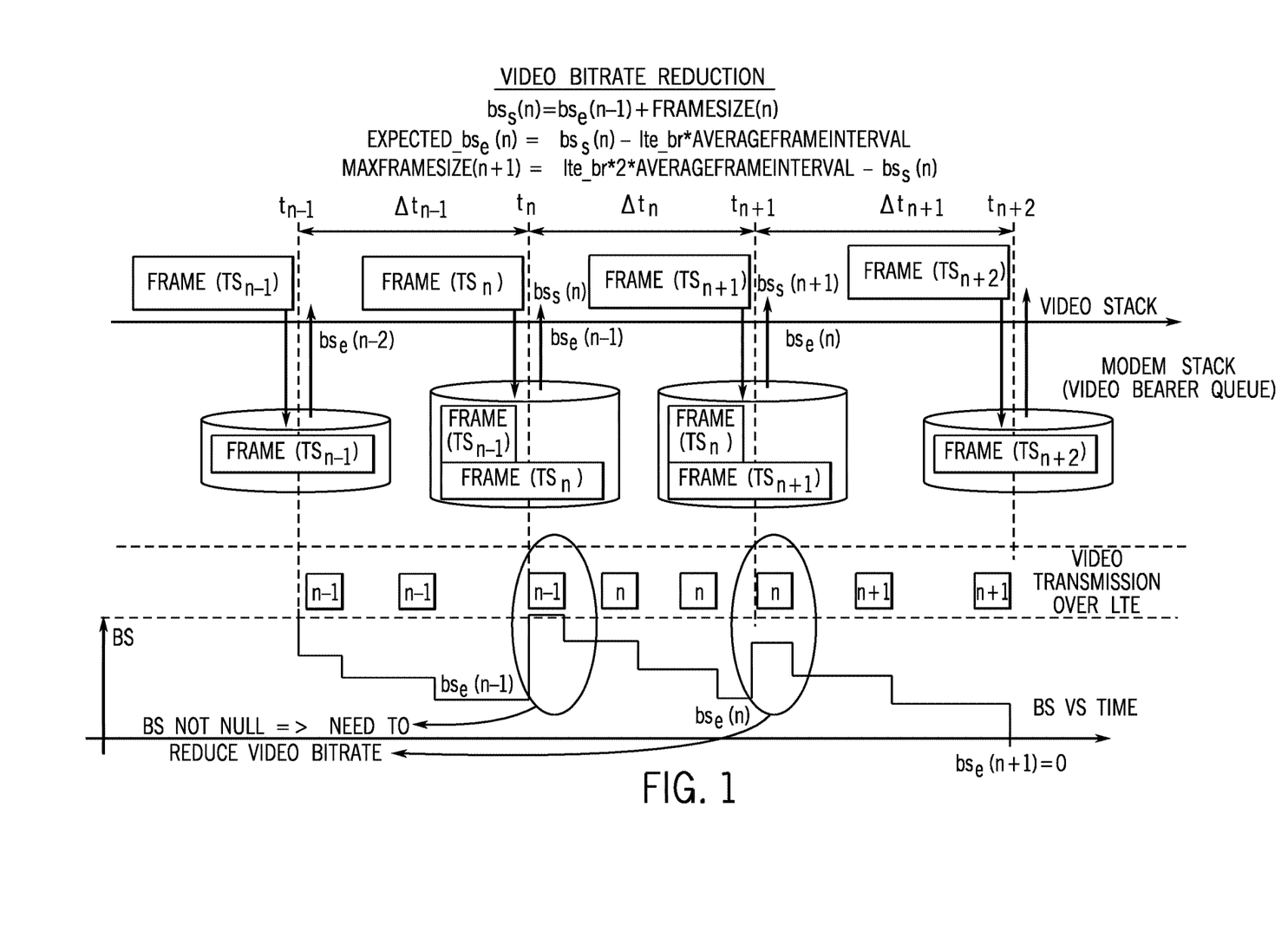
FIG. 1 is a timing diagram for the first embodiment where the bitrate is decreased.

Thus as shown in FIG. 1, when there is significant congestion, BS is not zero, so the rate of data transmission over LTE may be reduced. The modem's stack sends the BS value to the video stack.

However, if $bs_e(n-1)=0$ at $t=t_n$, then the wireless base station scheduler is assigning more uplink bandwidth than the current video bitrate. In other words, video bitrate can be increased. Then the radio bitrate during the last video frame interval is equal to:

$$\text{Radio bitrate} = lte_{br}(n) = \frac{bs_s(n-1)}{\Delta T_{bs0}}$$

Figure 2:
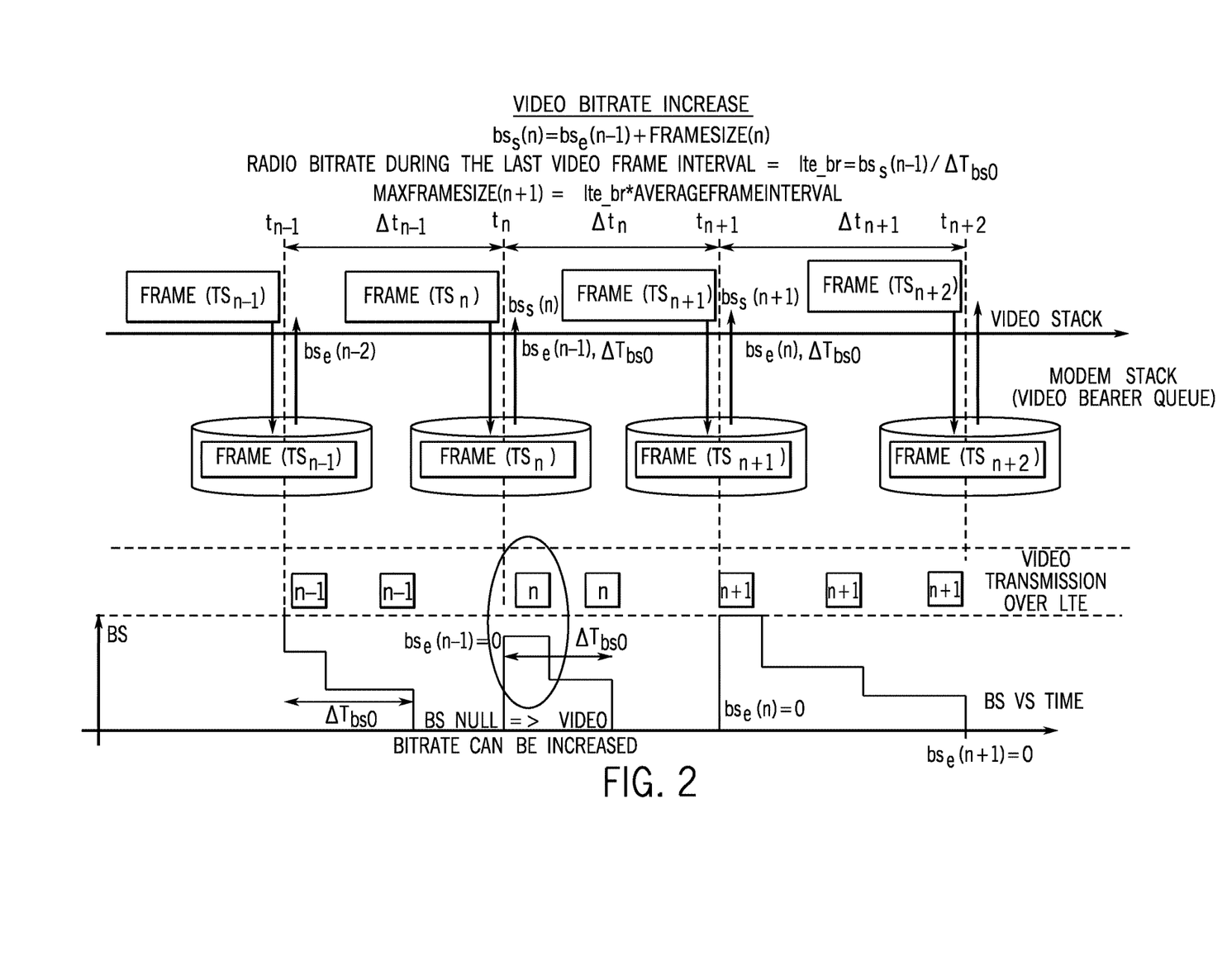
FIG. 2 is a timing diagram for the first embodiment where the bitrate is increased.

As shown in FIG. 2, the maximum frame size of the next frame is then equal to:

$\text{maxFrameSize}(n+1)=lte_{br}(n)*\text{averageFrameInterval}(n)$

Therefore the video sender bitrate may be controlled by the maximum frame size which is dynamic and can change to adapt to uplink radio conditions.

The BS is a metric that the modem stack maintains. This metric is viewed and updated when the video source pushes video data in the modem and when the modem pulls some of these video data to be transmitted over the wireless link. When a new video frame is pushed into the video bearer queue, modem layer 2 has to update the BS of this bearer. This tuple of BS, $\Delta T_{bs0}$ can be reported to the video layer via a modem application programming interface (API) call in one example.

Figure 3:
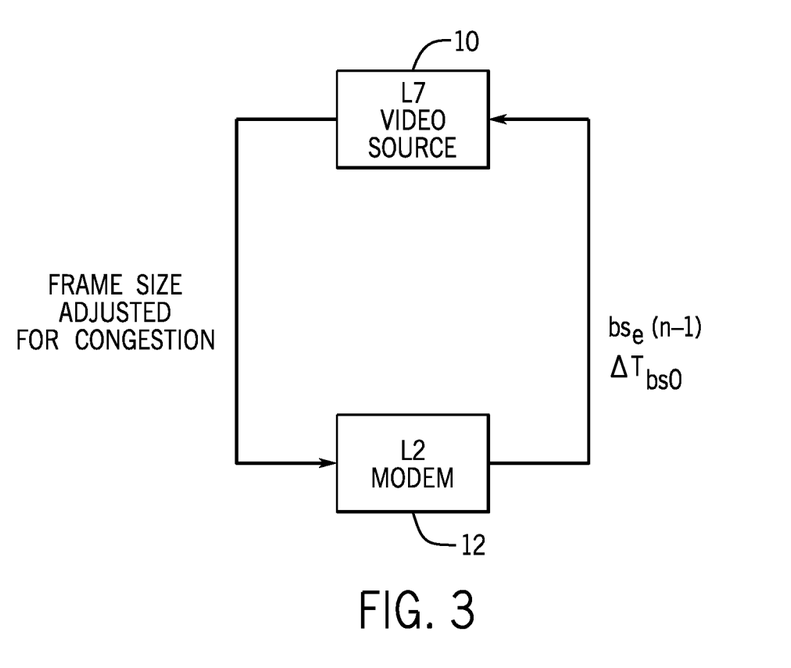
FIG. 3 is a high level depiction of a first embodiment.

Thus referring to FIG. 3, the modem or L2 layer 12 transmits frames. The modem or L2 layer 12 provides the BS and $\Delta T_{bs0}$ values to the level 7 or video source 10. The source in this embodiment calculates the uplink radio channel bandwidth. Then the frame size that it requests the modem 12 to send is adjusted for this congestion.

Figure 4:
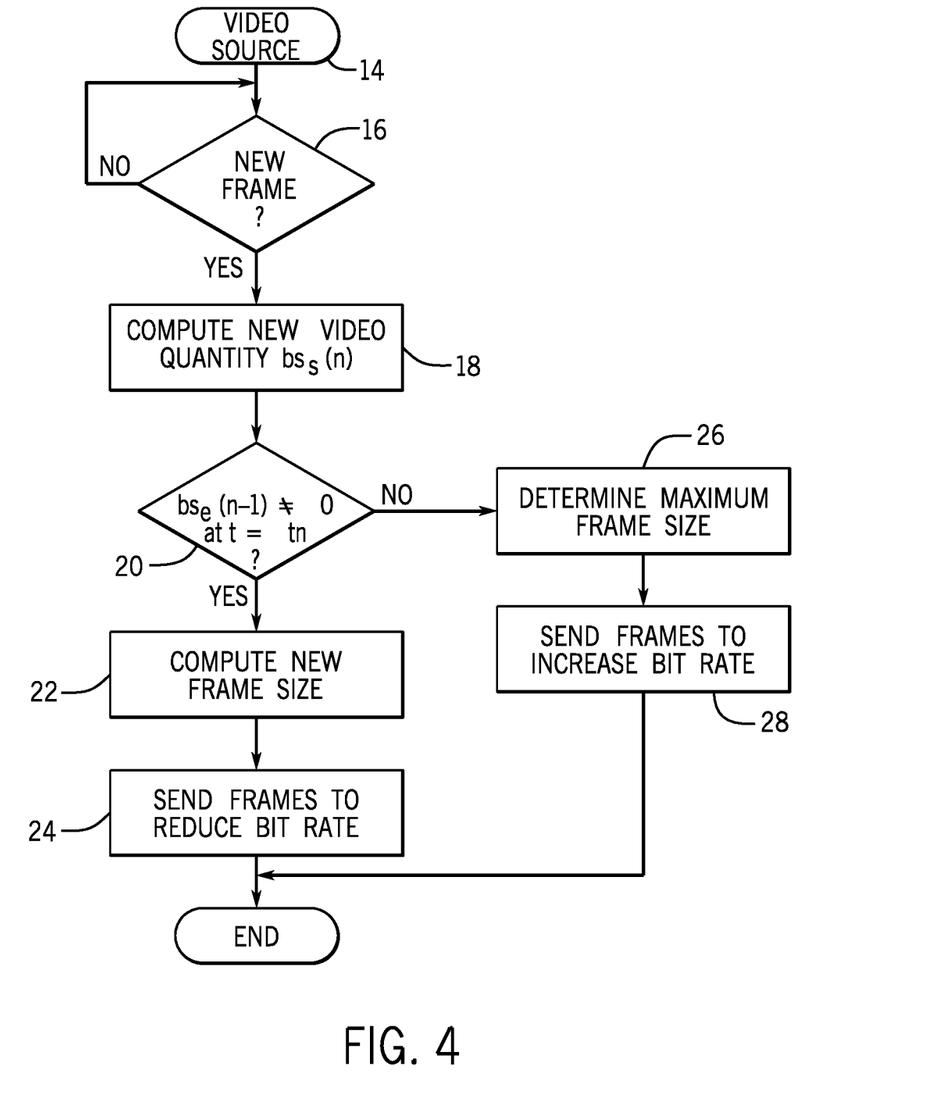
FIG. 4 is a flow chart for the first embodiment.

Referring to FIG. 4, a video source or stack sequence 14 may be implemented in software, firmware and/or hardware. In software and firmware embodiments it may be implemented by computer executed instructions stored in one or more non-transitory computer readable media, such as magnetic, semiconductor or optical storage.

The sequence 14 begins when a new frame is received as indicated at diamond 16. In this case, the new video quantity $bs_s(n)$ is calculated as indicated in block 18.

A check at diamond 20 determines whether $bs_e(n-1)$ is not zero at time $t_n$. If so, a new frame size is computed at block 22. Then at block 24 the frame is sent to reduce the bitrate.

If the inquiry at diamond 20 is negative, then at block 26 the maximum frame size is determined. Then the maximum possible frame size is sent to increase the bit rate as indicated in block 28.

Alternatively, the instantaneous radio bit rate of the video bearer, instead of the BS, can be computed in the modem stack and returned to the video stack. The video stack then sets the maximum video bitrate based on this calculated instantaneous radio bit rate. In one embodiment, the video stack can smooth the frame size changes by defining a maximum step of frame size change.

Figure 5:
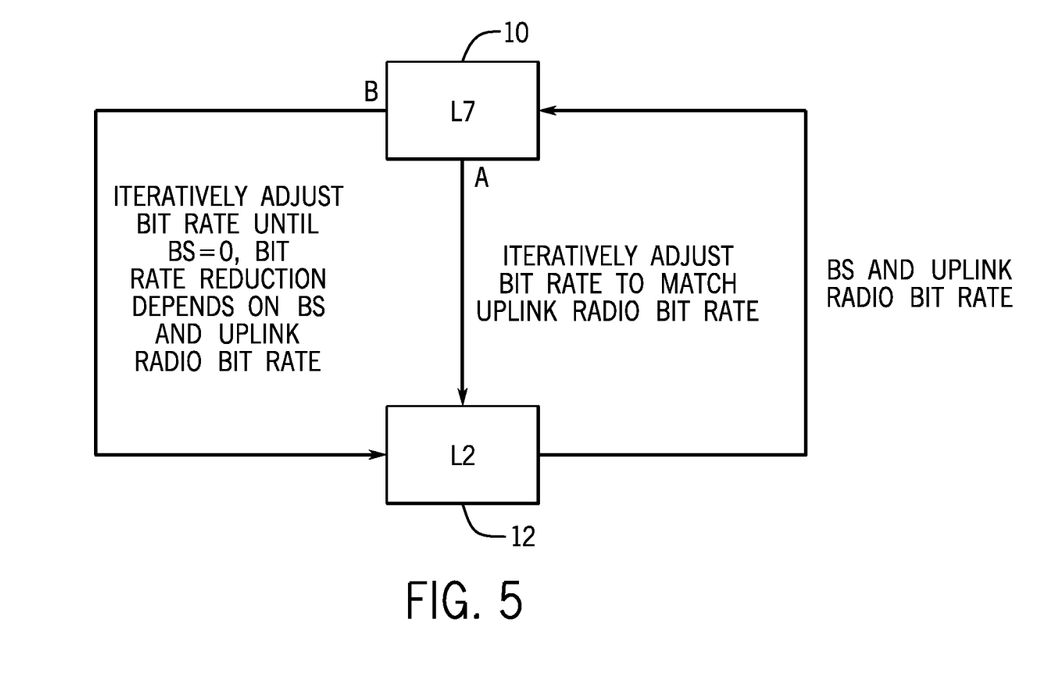
FIG. 5 is a high level depiction for second and third embodiments.

Thus referring to FIG. 5, the level 2 modem layer 12 sends the BS and an uplink radio bitrate that it calculates. Then in embodiment A, the level 7 video stack 10 iteratively adjusts the bitrate to match the uplink radio bitrate it receives from the modem 12.

In embodiment B, the L7 layer 10 iteratively adjusts the bitrate until BS equals zero. A bit rate reduction size depends on BS and the uplink radio bit rate received from the modem 12 in some embodiments.

Figure 6:
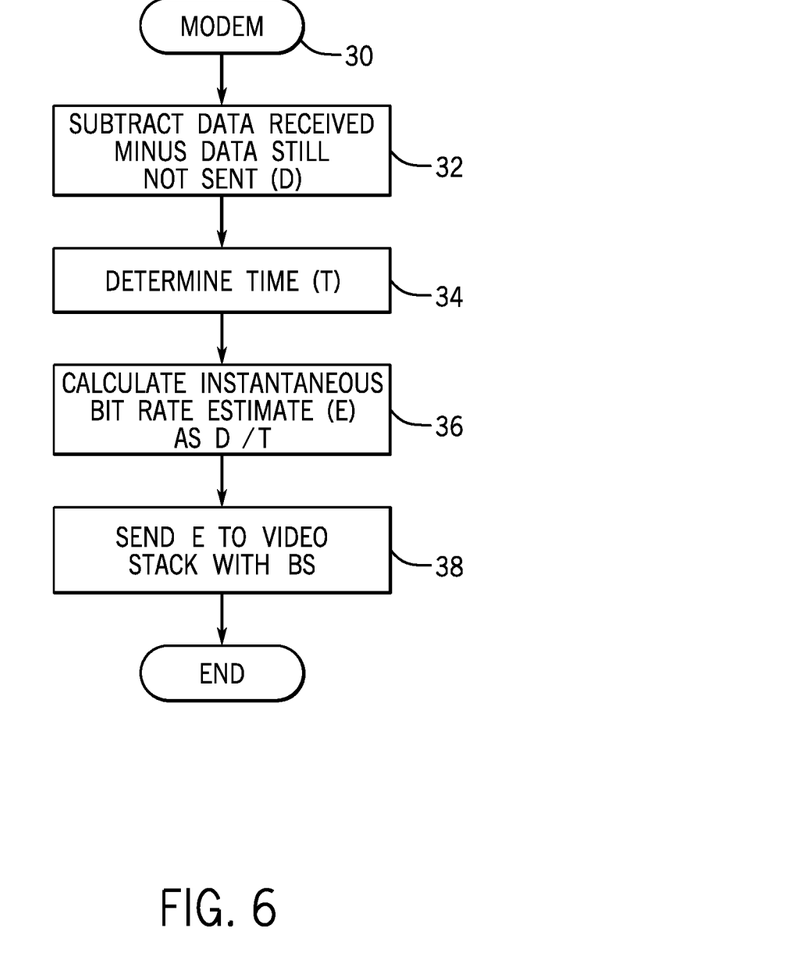
FIG. 6 is a flow chart for a modem in the second embodiment.

The calculation in the modem may be done using the sequence 30 shown in FIG. 6. The sequence 30 may be implemented in software, firmware and/or hardware. In software and firmware embodiments it may be implemented by computer executed instructions stored in one or more non-transitory computer readable media such as magnetic, optical or semiconductor storage.

The sequence 30 begins by subtracting the amount of data received minus the data still not sent represented by the value D as indicated in block 32. The time T over which the data was sent is determined in block 34. Then the instantaneous bitrate estimate E is calculated as D/T as indicated in block 36. Finally, the bitrate estimate E is sent to the video stack with the value BS as indicated in block 38.

Figure 7:
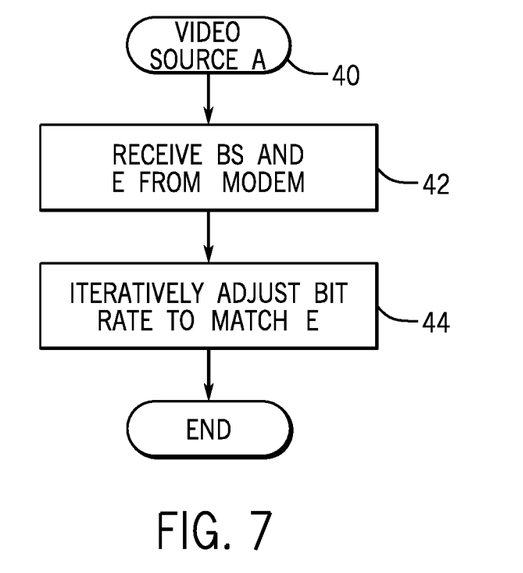
FIG. 7 is a video stack flow chart for the second embodiment.

In accordance with an alternate embodiment A wherein the calculations are offloaded to the modem, a sequence 40, shown in FIG. 7 may be implemented in software, firmware and/or hardware. In software and firmware embodiments, it may be implemented by computer executed instructions stored in one or more non-transitory computer readable media such as magnetic, optical or semiconductor storage.

The sequence begins by receiving, in the video stack, the BS and the instantaneous bitrate estimate E from the modem as indicated in block 42. Then the video stack iteratively adjusts the bitrate to match the value E as indicated in block 44.

Figure 8:
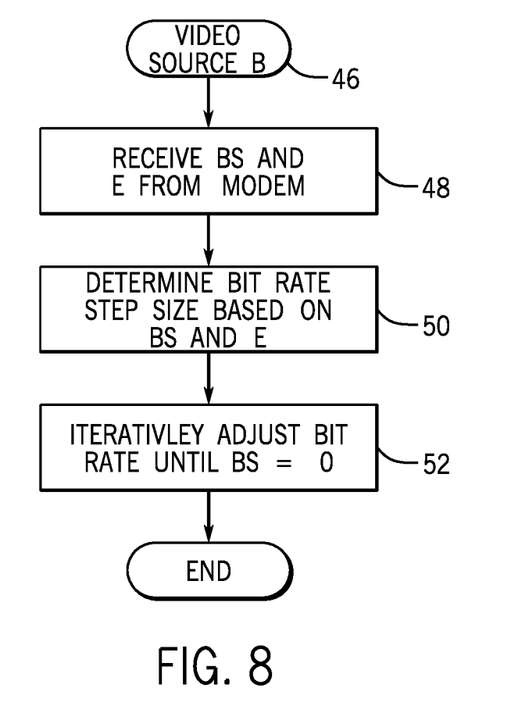
FIG. 8 is a video stack flow chart for the third embodiment.

The sequence 46 shown in FIG. 8 describes embodiment B from FIG. 5. The sequence 46 may be implemented in software, firmware and/or hardware. In software and firmware embodiments, it may be implemented by computer executed instructions stored in one or more non-transitory computer readable media such as magnetic, optical or semiconductor storage.

The sequence 46 shown in FIG. 8 begins by receiving the BS and the value E from the modem as indicated in block 48. However, this time the video stack determines the bitrate based on the BS and the value of E as indicated in block 50. The video stack iteratively adjusts the bitrate until BS equals zero as indicated in block 52.

In another embodiment, the modem reports only the BS as "not null" to the video source to reduce the video bitrate and the video source uses other metrics to attempt to increase the video bitrate when possible.

Figure 9:
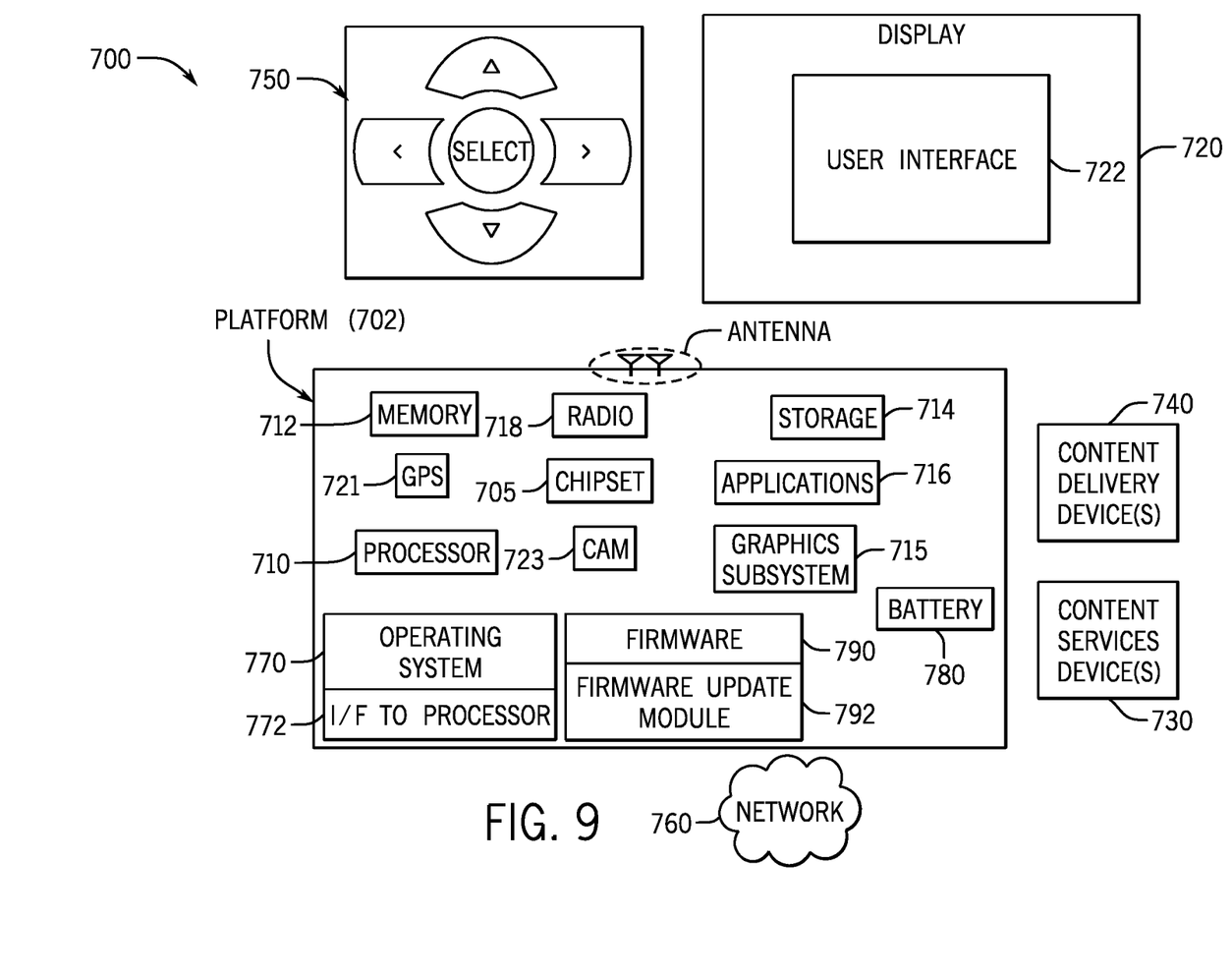
FIG. 9 is a system depiction for one embodiment.

FIG. 9 illustrates an embodiment of a system 700. In embodiments, system 700 may be a transmitter although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 4, 6, 7, and 8 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise storage technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

Figure 10:
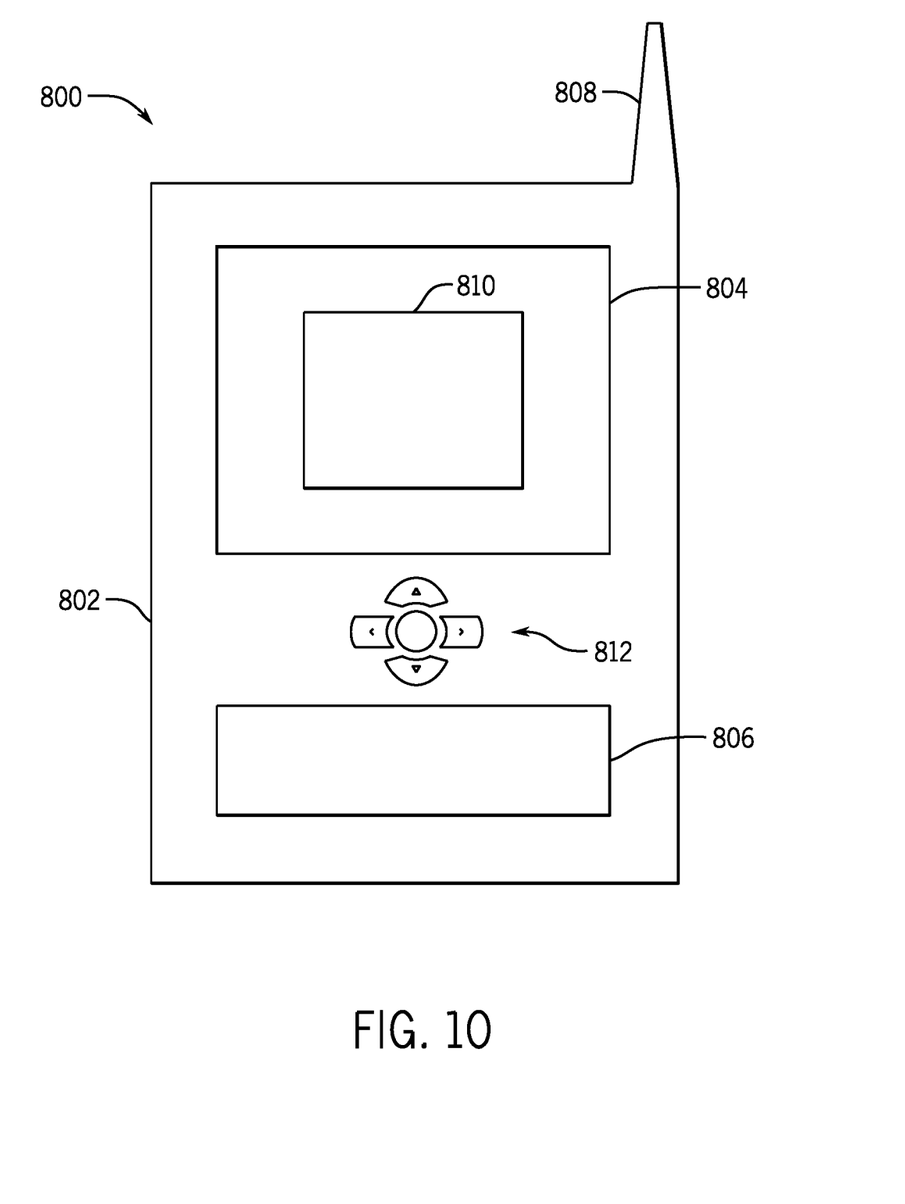
FIG. 10 is front elevation of a system according to one embodiment.

As shown in FIG. 10, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method for sending video over a cellular link comprising obtaining, from a modem layer, an uplink buffer status metric, using the metric to derive an indication, transmitting the indication from the modem layer to a video source application, and using the indication to adjust a video bitrate or frame size. The method may include determining the uplink buffer status and uplink radio bitrate in the modem layer. The method may include iteratively adjusting the video bitrate in the video source application to the uplink radio bitrate. The method may include iteratively adjusting the video bitrate until unsent video from a previous frame (BS) is zero. The method may include adjusting a bitrate reduction step size based on BS and the uplink radio bitrate. The method may include transmitting the indication indicating an amount of unsent video from a previous frame from the modem layer to the video source. The method may include determining the indication at the video source. The method may include wherein the indication is the uplink buffer status metric. The method may include where the uplink buffer status metric is used to determine an uplink video bitrate in the modem layer.

In another example embodiment may be one or more non-transitory computer readable media storing instructions to perform a sequence comprising obtaining, from a modem layer, an uplink buffer status metric, using the metric to derive an indication, transmitting the indication from the modem layer to a video source application, and using the indication to adjust a video bitrate or frame size. The media may include further storing instructions to perform a sequence including determining the uplink buffer status and uplink radio bitrate in the modem layer. The media may include further storing instructions to perform a sequence including iteratively adjusting the video bitrate in the video source application to the uplink radio bitrate. The media may include further storing instructions to perform a sequence including iteratively adjusting the video bitrate until unsent video from a previous frame (BS) is zero. The media may include further storing instructions to perform a sequence including adjusting a bitrate reduction step size based on BS and the uplink radio bitrate. The media may include further storing instructions to perform a sequence including transmitting the indication indicating an amount of unsent video from a previous frame from the modem layer to the video source. The media may include further storing instructions to perform a sequence including determining the indication at the video source. The media may include further storing instructions to perform a sequence wherein the indication is the uplink buffer status metric. The media may include further storing instructions to perform a sequence where the uplink buffer status metric is used to determine an uplink video bitrate in the modem layer.

Another example embodiment may be an apparatus comprising a transmitter to obtain, from a modem layer, an uplink buffer status metric, use the metric to derive an indication, transmit the indication from the modem layer to a video source application, use the indication to adjust a video bitrate or frame size, and an antenna coupled to said transmitter. The apparatus may include said transmitter to determine the uplink buffer status and uplink radio bitrate in the modem layer. The apparatus may include said transmitter to iteratively adjust the video bitrate in the video source application to the uplink radio bitrate. The apparatus may include said transmitter to iteratively adjust the video bitrate until unsent video from a previous frame (BS) is zero. The apparatus may include said transmitter to adjust a bitrate reduction step size based on BS and the uplink radio bitrate. The apparatus may include said transmitter to transmit the indication indicating an amount of unsent video from a previous frame from the modem layer to the video source. The apparatus may include said transmitter to determine the indication at the video source. The apparatus may include said transmitter wherein the indication is the uplink buffer status metric. The apparatus may include said transmitter where the uplink buffer status metric is used to determine an uplink video bitrate in the modem layer. The apparatus may include a battery. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method for sending video over a wireless link comprising:
   transmitting video data by a wireless modem of a wireless video device via the wireless link, the wireless video device comprising a modem layer to control the wireless modem of the wireless video device;
   obtaining, from the modem layer of the wireless video device, an uplink buffer status metric associated with the wireless link;
   transmitting an indication directly from the modem layer of the wireless video device to a video source application of the wireless video device, wherein the indication is based on the uplink buffer status metric; and
   the video source application using the indication transmitted from the modem layer to adjust a video bitrate or frame size.

2. The method of claim 1 including determining the uplink buffer status and uplink radio bitrate in the modem layer.

3. The method of claim 2 including iteratively adjusting the video bitrate in the video source application to the uplink radio bitrate.

4. The method of claim 2 including iteratively adjusting the video bitrate until an amount of unsent video data from a previous frame is zero.

5. The method of claim 4 including adjusting a bitrate reduction step size based on the amount of unsent video data from the previous frame and the uplink radio bitrate.

6. The method of claim 1 including transmitting the indication indicating an amount of unsent video data from a previous frame from the modem layer to the video source.

7. The method of claim 1 wherein the indication is the uplink buffer status metric.

8. The method of claim 1 where the uplink buffer status metric is used to determine an uplink video bitrate in the modem layer.

9. One or more non-transitory computer readable media storing instructions to perform a sequence comprising:
   transmitting video data by a wireless modem of a wireless video device via a wireless link, the wireless video device comprising a modem layer to control the wireless modem of the wireless video device;

obtaining, from the modem layer of the wireless video device, an uplink buffer status metric associated with the wireless link;

transmitting an indication directly from the modem layer of the wireless video device to a video source application of the wireless video device, wherein the indication is based on the uplink buffer status metric; and the video source application using the indication transmitted from the modem layer to adjust a video bitrate or frame size.

10. The one or more non-transitory computer readable media of claim 9, further storing instructions to perform a sequence including determining the uplink buffer status and uplink radio bitrate in the modem layer.

11. The one or more non-transitory computer readable media of claim 10, further storing instructions to perform a sequence including iteratively adjusting the video bitrate in the video source application to the uplink radio bitrate.

12. The one or more non-transitory computer readable media of claim 10, further storing instructions to perform a sequence including iteratively adjusting the video bitrate until an amount of unsent video from a previous frame is zero.

13. The one or more non-transitory computer readable media of claim 12, further storing instructions to perform a sequence including adjusting a bitrate reduction step size based on the amount of unsent video data from the previous frame and the uplink radio bitrate.

14. The one or more non-transitory computer readable media of claim 9, further storing instructions to perform a sequence including transmitting the indication indicating an amount of unsent video from a previous frame from the modem layer to the video source.

15. The one or more non-transitory computer readable media of claim 9, further storing instructions to perform a sequence wherein the indication is the uplink buffer status metric.

16. The one or more non-transitory computer readable media of claim 9, further storing instructions to perform a sequence where the uplink buffer status metric is used to determine an uplink video bitrate in the modem layer.

17. A wireless video apparatus comprising:
a wireless modem to transmit video data via a wireless link;
a modem layer to:
control the wireless modem,
obtain an uplink buffer status metric associated with the wireless link,
transmit an indication directly from the modem layer to a video source application of the wireless video apparatus,
the video source application to use the indication to adjust a video bitrate or frame size; and
an antenna coupled to said transmitter.

18. The wireless video apparatus of claim 17, said modem layer to determine the uplink buffer status and uplink radio bitrate.

19. The wireless video apparatus of claim 18, said video source application to iteratively adjust the video bitrate to the uplink radio bitrate.

20. The wireless video apparatus of claim 18, said video source application to iteratively adjust the video bitrate until an amount of unsent video from a previous frame is zero.

21. The wireless video apparatus of claim 20, said video source application to adjust a bitrate reduction step size based on the amount of unsent video data from the previous frame and the uplink radio bitrate.

22. The wireless video apparatus of claim 17, said modem layer to transmit the indication indicating an amount of unsent video from a previous frame to the video source application.

23. The wireless video apparatus of claim 22, said video source application to determine the indication.

24. The wireless video apparatus of claim 17, wherein the indication is the uplink buffer status metric.

25. The wireless video apparatus of claim 17, where the uplink buffer status metric is used to determine an uplink video bitrate in the modem layer.

26. The wireless video apparatus of claim 17 including a battery.

* * * * *

UNITED STATES PATENT AND TRADEMARK OFFICE
CERTIFICATE OF CORRECTION

PATENT NO. : 10,743,210 B2  
APPLICATION NO. : 15/170005  
DATED : August 11, 2020  
INVENTOR(S) : Eric Perraud et al.

Page 1 of 1

It is certified that error appears in the above-identified patent and that said Letters Patent is hereby corrected as shown below:

On the Title Page

Item (73), Assignee:  
"Intel Corporation"  
Should be:  
--Intel IP Corporation.--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*